US008045509B2

(12) United States Patent
Lee et al.

(10) Patent No.: US 8,045,509 B2
(45) Date of Patent: Oct. 25, 2011

(54) NETWORK MOVEMENT DETECTION METHOD IN MOBILE NODE OF DSMIP6 ENVIRONMENT

(75) Inventors: Joo Chul Lee, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 276 days.

(21) Appl. No.: 12/518,234

(22) PCT Filed: Oct. 31, 2007

(86) PCT No.: PCT/KR2007/005424
§ 371 (c)(1),
(2), (4) Date: Jun. 8, 2009

(87) PCT Pub. No.: WO2008/069450
PCT Pub. Date: Jun. 12, 2008

(65) Prior Publication Data
US 2010/0061270 A1    Mar. 11, 2010

(30) Foreign Application Priority Data
Dec. 8, 2006  (KR) .................. 10-2006-0124368

(51) Int. Cl.
*H04L 12/28* (2006.01)
(52) U.S. Cl. ......... 370/328; 370/338; 370/401; 709/220
(58) Field of Classification Search .................. None
See application file for complete search history.

(56) References Cited

U.S. PATENT DOCUMENTS

| 6,862,274 | B1 * | 3/2005 | Tsao et al. ............. 370/338 |
| 7,305,480 | B2 * | 12/2007 | Oishi et al. ............. 709/230 |
| 7,539,773 | B2 * | 5/2009 | Akisada et al. ............. 709/245 |
| 7,630,340 | B2 * | 12/2009 | Jung et al. ............. 370/331 |
| 2002/0147820 | A1 * | 10/2002 | Yokote ............. 709/229 |
| 2002/0159465 | A1 * | 10/2002 | Watanuki et al. ............. 370/401 |
| 2003/0018810 | A1 | 1/2003 | Karagiannis et al. |
| 2003/0104814 | A1 * | 6/2003 | Gwon et al. ............. 455/436 |
| 2003/0144001 | A1 * | 7/2003 | Nakatsugawa et al. ....... 455/445 |

(Continued)

FOREIGN PATENT DOCUMENTS
EP    1 087 575 A1    3/2001
(Continued)

OTHER PUBLICATIONS

Hesham Soliman et al., Mobile IPv6 support for dual stack Hosts and Routers (DSMIPv6), IETF, vol. Draft-02, Jun. 2006, 22 pages.

(Continued)

*Primary Examiner* — Hassan Phillips
*Assistant Examiner* — Duc Duong
(74) *Attorney, Agent, or Firm* — Staas & Halsey LLP

(57) ABSTRACT

There is provided a movement detection method of a mobile node in a DSMIP6 environment. The movement detection method includes performing neighbor unreachability detection in a network to which a mobile node moves, confirming network movement detection and simultaneously performing IPv4 address allocation when the neighbor unreachability detection fails, performing router discovery at the same time as the IPv4 address allocation, recognizing the movement detection into the IPv4 network when the IPv4 address allocation succeeds, and recognizing the movement detection into the IPv6 network when the router discovery and the IPv6 router discovery succeed. Therefore, the movement detection method can be useful to continuously perform operations as defined in a DSMIP6 specification so as to confirm whether the network to which the mobile node moves is an IPv6 network or an IPv4 network and detect movement to the confirmed network, and to perform a binding update in time.

8 Claims, 2 Drawing Sheets

U.S. PATENT DOCUMENTS

| | | |
|---|---|---|
| 2004/0184465 A1 | 9/2004 | Lee et al. |
| 2004/0218566 A1 | 11/2004 | Han |
| 2005/0008032 A1* | 1/2005 | Yamamoto et al. ........... 370/466 |
| 2006/0095585 A1* | 5/2006 | Meijs et al. ................... 709/245 |
| 2007/0081512 A1 | 4/2007 | Takeda et al. |
| 2007/0258424 A1* | 11/2007 | Wable et al. .................. 370/338 |
| 2008/0192758 A1* | 8/2008 | Mahkonen .................... 370/401 |

FOREIGN PATENT DOCUMENTS

| | | |
|---|---|---|
| KR | 10-2004-0082655 | 9/2004 |
| KR | 10-2006-0016496 | 2/2006 |
| KR | 10-2006-0028740 | 3/2006 |
| KR | 10-2006-0070322 | 6/2006 |
| KR | 10-2006-0097518 | 9/2006 |

OTHER PUBLICATIONS

B. Aboba et al., Detecting Network Attachment in IPv4 (DNAv4), IETF, vol. RFC4436, Mar. 2006, 14 pages.

International Search Report for PCT/KR2007/005424, mailed Feb. 12, 2008.

* cited by examiner

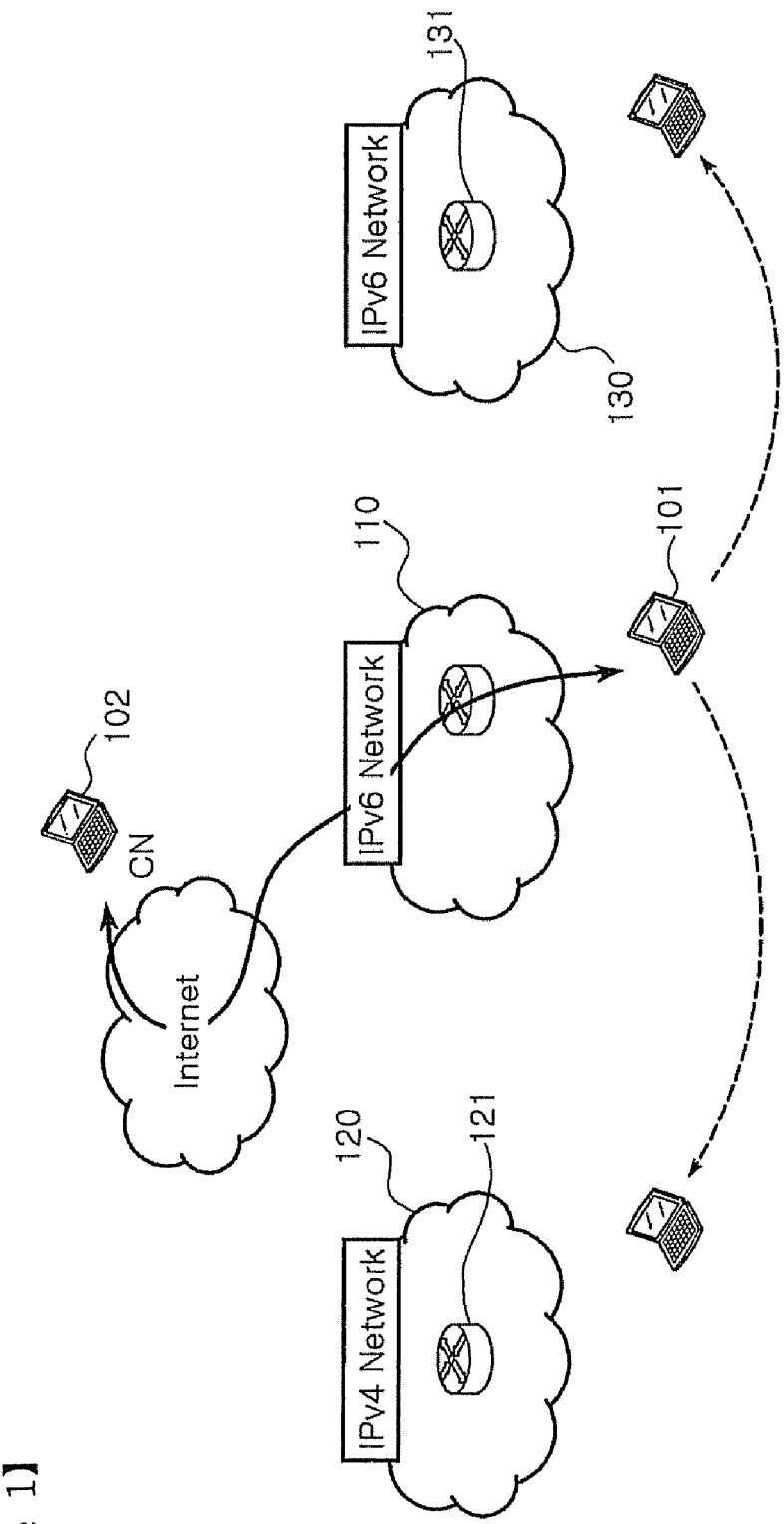
[Figure 1]

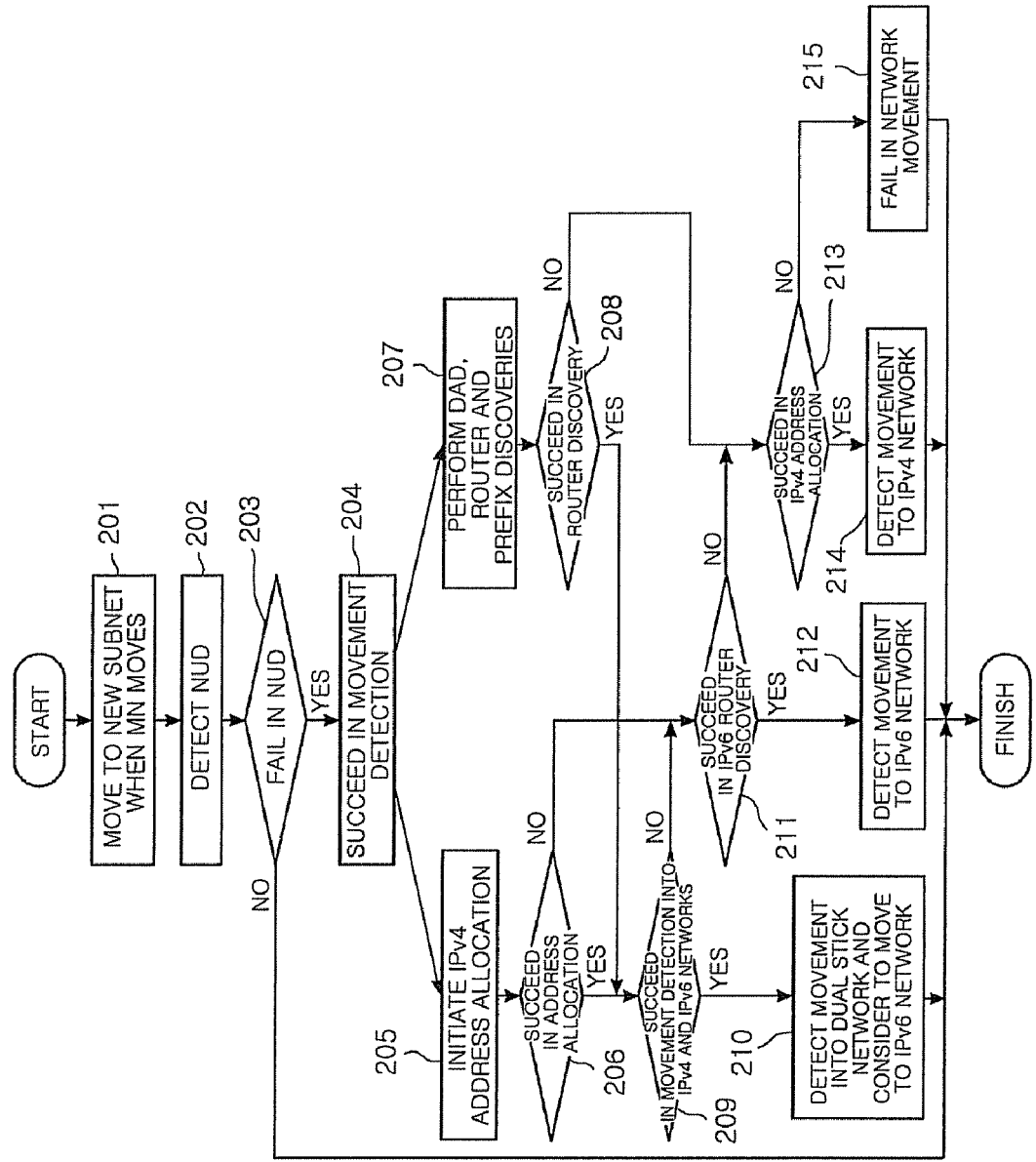
[Figure 2]

NETWORK MOVEMENT DETECTION METHOD IN MOBILE NODE OF DSMIP6 ENVIRONMENT

CROSS REFERENCE TO RELATED APPLICATIONS

This application claims the benefit under 35 U.S.C. Section 371, of PCT International Application Number PCT/KR2007/005424, filed Oct. 31, 2007 and Korean Application No. 10-2006-0124368 filed Dec. 8, 2006 in Korea, the contents of which are incorporated herein by reference.

TECHNICAL FIELD

The present invention relates to a network movement detection method in a mobile node of a dual stack mobile IPv6 (DSMIP6) environment, and more particularly, to a movement detection method of a mobile node with a dual stack if the mobile node moves in a dual stack mobile IPv6 (DSMIP6) environment using an internet protocol version 4 (IPv4).

This work was supported by the IT R&D program of MIC/IITA [2006-P10-36, Study of Next Generation Network Technology Standardization IPv6 based Mobility Support]

BACKGROUND ART

Generally, MIP6 is a technique for backing up its movement in an internet protocol version 6 (hereinafter, referred to as IPv6) network. The IPv6 is a next version of the internet protocol version 4 (hereinafter, referred to as IPv4) that has been used for an internet transfer protocol, and its normalization has been nearly completed by the internet engineering task force (IETF).

However, the IPv4 has been used in the internet addressing system since it is not completely changed into the IPv6. The change of the IPv4 into IPv6 network does not occur in a moment, and therefore the internet networks are in a mixed state where the IPv4 and IPv6 networks are used together.

Accordingly, an MIP6 standardization has been under way by an MIP6 working group (MIP6 WG) of the IETF by proposing a protocol dual stack MIP6 (hereinafter, referred to as DSMIP6) in order to operate the MIP6 in an environment in which the IPv4 network and the IPv6 network are used in a mixed state. Due to the characteristics of the DSMIP6, the MIP6 mobile node easily moves to different networks or the same network. In this case, a method for detecting movement of an MIP 6 mobile node is necessarily required for performing a binding update (BU) procedure according to the network movement.

However, it is recommended from a DSMIP6 specification to see a separate literature (DNAv4; Detecting Network Attachment in IPv4, RFC4436) for the movement to an IPv6-IPv4 network, but the RFC4436 literature discloses only the movement to an IPv4 network. Therefore, it is difficult to detect the movement of mobile nodes from the IPv6 network to the IPv4 network using the DSMIP6 specification.

DISCLOSURE OF INVENTION

Technical Problem

An aspect of the present invention provides a method of detecting movement to a network by determining whether a new network to which an MIP6 mobile node with a dual stack moves is an IPv6 or an IPv4 in an internet service system that operates under a mixed internet network environment in which the IPv4 and IPv6 networks are used in a mixed state.

Technical Solution

According to an aspect of the present invention, there is provided A network movement detection method in a mobile node of a DSMIP6 environment, the method comprising: moving into new network; performing neighbor unreachability detection into the new network; confirming network movement detection and simultaneously performing IPv4 address allocation when the neighbor unreachability detection fails; performing router discovery at the same time as the IPv4 address allocation, recognizing the movement detection into the IPv4 network when the IPv4 address allocation succeeds; and recognizing the movement detection into the IPv6 network when the router discovery and the IPv6 router discovery succeed.

BRIEF DESCRIPTION OF THE DRAWINGS

FIG. 1 is a schematic view illustrating a configuration of an internet service network in which an IPv4 network are mixed with an IPv6 network according to exemplary embodiments of the present invention.

FIG. 2 is a flowchart illustrating a network movement detection procedure when a mobile node on a dual stack MIP6 moves to an IPv4 network according to an exemplary embodiment of the present invention.

BEST MODE FOR CARRYING OUT THE INVENTION

Hereinafter, exemplary embodiments of the present invention will now be described in detail with reference to the accompanying drawings. However, it should be understood that the same parts have the same reference numerals in the accompanying drawings when parts are endowed with their own reference numerals. In addition, it should be understood that detailed descriptions of known functions and configurations of the parts are omitted for clarity when the detailed descriptions are unnecessarily considered to depart from the scopes and spirits of the present invention.

For the exemplary embodiments of the present invention, the network movement detection method of a mobile node will be described in detail with reference to the DSMIP6 protocol which is employed in a mixed internet network environment in which the IPv4 and IPv6 networks are used in a mixed state and whose standardization is under way. For the exemplary embodiments of the present invention, the network movement detection method of a mobile node may also be used to determine whether a network to which the mobile node moves is an IPv6 network, an IPv4 network or an IPv6/IPv4 dual network when an MIP6 mobile node moves from an IPv6 network to an IPv4 network under this mixed internet network environment.

The DSMIP6 basically uses the MIP6 network, and therefore the movement between IPv6 networks is detected using the method defined in an MIP6 specification. In general, the network movement detection method for L3 handover in the MIP6 protocol is a method using neighbor unreachability detection (NUD) to a default router. First of all, one example that a network movement detection using this conventional method is performed will be described, and then the movement detection method according to an exemplary embodiment of the present invention, which is distinct from the conventional method, will be described in detail.

The network movement detection may be dividedly performed when an MIP6 mobile node (MN) moves while communications are being made (during communications, or while making communications), when the MN moves in an idle state but immediately receives a router advertisement (RA) message, and when the MIP6 MN moves in an idle state. Here, the idle state means a state that the MIP6 mobile node (MN) and the correspondent node (CN) do not exchange a packet.

First, when the MIP6 mobile node (MN) moves while communications are being made, the MIP6 mobile node continues to transmit/receive a packet, and therefore the MIP6 mobile node may immediately detect unreachability to a default router when a link is interrupted and a new subnet is connected to the MIP6 mobile node.

Second, when the MIP6 MN moves in an idle state but immediately receives a router advertisement (RA) message, it is recognized that the MIP6 MN moves to an IPv6 network without transmitting/receiving a packet, but the MIP6 MN receives a router advertisement (RA) message as soon as it moves to a new subnet, and then moves to an IPv6 network.

Third, when the MIP6 MN moves in an idle state, the movement of the MIP6 MN in an idle state may not immediately detected using the NUD. Accordingly, the network movement may be detected only through an NUD failure in the new subnet when a RA message arrives at the MIP6 MN (when the tranferred network is an IPv6 network), or when the transferrd network is an IPv4 network.

When the movement detection is performed by one of the three cases, the MIP6 mobile node generates a new care-of address (CoA) through subsequent processes such as duplicate address detection (DAD) for a link local address (LLA), router discovery, prefix discovery and the like, and initiates a binding update (BU) procedure. The above three cases are just methods for the movement detection on the assumption that the network to which the mobile node moves is the IPv6 network, but they are insufficient to determine whether the move network is the IPv4 network. Also, it is difficult to use the movement detection method used in the MIPv4. That is, an agent function for MIPv4 should be provided in these three cases.

Accordingly, there is required a method of determining whether the network to which the mobile node moves is an IPv4 network in the mobile node, and therefore the movement detection method when a mobile node moves to different networks according to an exemplary embodiment of the present invention will be described in more detail, based on the above three cases. Hereinafter, one example that an MIP6 mobile node with a dual stack moves from an IPv6 network to an IPv4 network under an internet environment in which many networks are used in a mixed state will be described in detail.

FIG. 1 is a configuration view illustrating an internet service system according to exemplary embodiments of the present invention in which an IPv6 network and an IPv4 network are used in a mixed state.

Referring to FIG. 1, an internet environment according to an exemplary embodiment of the present invention may be composed of an internet service system in which IPv6 networks 110 and 130 and an IPv4 network 120 are used in a mixed state. Because a mobile node 101 has a transmission path connected to the IPv6 network 110 as a home network in the internet service system, the mobile node 101 moves to an IPv4 network 120 or another IPv6 network 130 while transmitting/receiving a packet to/from a correspondent node (CN) 102. Therefore, the mobile node 101 is connected using a router 121 in the moving IPv4 network 120 or a router 131 in another IPv6 network 130 to perform a home registration by acquiring an address from the router 121 or 131 and transmitting to a home agent (HA) a binding update (BU) message including a new allocated care-of address (CoA). In this case, the mobile node 101 may perform a binding update in time by detecting whether the network to which the mobile node moves is an IPv6 network 130 or an IPv4 network 120.

Then, as one example that the MIP6 mobile node (MN) moves while communications are being made as described in the first case, the movement detection method of a mobile node will be described in detail with reference to the accompanying drawing.

FIG. 2 is a flowchart illustrating a movement detection method when a mobile node on a dual stack MIP6 moves to an IPv4 network according to an exemplary embodiment of the present invention.

Referring to FIG. 2, when the mobile node moves while communications are being made, a mobile node is interrupted from a packet transmission path and moves to a new subnet in Operation 201.

Then, the mobile node immediately detects neighbor unreachability detection (hereinafter, referred to as NUD) to a default router in Operation 202, and then confirms that the NUD fails in Operation 203. Operation 204 is performed when NUD fails, but the movement detection operation is finished when NUD succeeds.

In the operation 204, the mobile node detects that the movement detection succeeds on the assumption that the network to which the mobile node moves is an IPv6 network when the NUD fails.

Therefore, the mobile node initiates an operation for address allocation according to the internet addressing protocol (Dynamic Host Configuration Protocol; DHCP) for the purpose of IPv4 address allocation (Operation 205). The mobile node determines whether the address allocation succeeds in Operation 206, and then operation 211 is performed when the address allocation does not succeed. At the same time, the mobile node performs a subsequent operation in Operation 207. That is, the mobile node performs duplicate address detection (DAD) for LLA, router discovery that detects a router reside in a link to the new network, and prefix discovery that confirms whether a correspondent node is present onto the link using a prefix. Then, the mobile node confirms whether the router discovery succeeds in Operation 208, and then operation 213 is performed when the router discovery does not succeed.

On the other hand, the mobile node confirms whether both of the IPv4 and IPv6 networks succeed in the movement detection in Operation 209 when the address allocation and the router discovery succeed in Operations 206 and 208. When both of the IPv4 and IPv6 networks succeed in the movement detection, the mobile node is considered to detect the movement to the dual stack IPv6 network and moves to an IPv6 network in Operation 210.

On the other hand, when the address allocation and the movement detection do not succeed in Operations 206 and 209, the mobile node confirms whether the IPv6 router discovery succeeds in Operation 211. As a result, when the IPv6 router discovery succeeds in the operation 211, the mobile node recognizes the movement detection into the IPv6 network in Operation 212. On the other hand, when the IPv6 router discovery does not succeed in the operation 211, or when it is confirmed that there is no response to the duplicate address detection performed in the operation 207 and the router discovery fails in the operation 208, the mobile node confirms whether the IPv4 network address allocation succeeds in Operation 213. As a result, the mobile node recognize movement detection into the IPv4 network when the IPv4 network address allocation succeeds in the operation 213 in Operation 214, whereas the mobile node recognizes that the network movement fails in Operation 215, and then finish operations.

In these procedures, the mobile node performs the NUD, and then performs the router discovery as described in the operation 208. Here, conditions for the failure of the router discovery is determined according to the receipt of response to a router solicitation (hereinafter, referred to as RS) message that the mobile node transmits to the corresponding router. Here, the router discovery is considered to fail when there is no response after a waiting time of MAX_RTR_SOLICITATION_DELAY (one second) when the mobile node transmits the RS message MAX_RTR_SOLICITATIONS (3 times) at a minimum interval of RTR_SOLICITATION_INTERVAL (4 seconds). In this case, its total time is approximately 13 seconds. Accordingly, the mobile node performs the IPv4 address allocation through the DHCP within the above time limit. And, the operations 207 and 208 are finished immediately when the IPv4 address allocation succeeds during the operations 207 and 208 (the DHCP procedure is mainly finished first when the network to which the mobile node moves is an IPv4 network), and then the mobile node performs a home registration of the IPv4 CoA.

When the above-mentioned movement detection procedures are completed, the mobile node transmits a binding update (BU) message to a home agent (HA) (not shown) to register a new care-of address (CoA), the binding update (BU) message including the new care-of address (CoA) that is allocated according to the addresses acquired from new routers in the IPv6 network.

Meanwhile, the second and third cases are also applicable to the movement detection method according to an exemplary embodiment of the present invention.

When the mobile node moves to a new network (subnet) in an idle state where the mobile node does not transmit/receive a packet to/from a correspondent node as described in the second and third cases, the mobile node may determine whether the network to which the mobile node moves is an IPv6 network or an IPv4 network according to the reception of the router advertisement (RA) message from received from the new network and the NUD failure.

When the mobile node receives the router advertisement message, which periodically notices the possibility of using the mobile node, from a router in a new network immediately whenever it is connected to the new network as described in the second case, the mobile node detects movement to the IPv6 network by recognizing the new network to which the mobile node moves as the IPv6 network.

Also, when the mobile node moves in an idle state as described in the third case, link up/down network movement is caused by employing L2 trigger information, namely, L2 network movement information. In this case, the mobile node performs NUD to a default router, and then performs movement detection through the subsequent operations as shown in FIG. 2. That is to say, since the mobile node does not detect the movement through the NUD, the mobile node recognizes the new network to which the mobile node moves to be an IPv6 network when it receives a RA message right after the NUD fails, and recognizes the new network to which the mobile node moves to be an IPv4 network since the router discovery fails when it does not receives a RA message for a certain time.

As described above, the IPv4 movement detection method in the DSMIP6 environment according to an exemplary embodiment of the present invention may be useful to continuously operate DSMIP6 to detects movement to the IPv4 network when the dual stack MN, which may drive an MIP6 protocol in a network environment in which IPv4 and IPv6 networks are used in a mixed state, moves from an IPv6 network to an IPv4 network.

Also, the IPv4 movement detection method in the DSMIP6 environment according to an exemplary embodiment of the present invention may be implemented using a computer-readable code in computer-readable recording media. The computer-readable recording media include all kinds of recording systems that store data that may be read by a computer system. Examples of the computer-readable recording media include ROM, RAM, CD-ROM, a magnetic tape, a hard disk, a floppy disk, a flash memory, an optical data storage device, and the like, and the computer-readable recording media include recording systems that are used in the form of carrier waves (for example, in the form of transmission through internets). Also, since the computer-readable recording media are distributed in the computer system connected to the computer communication networks, the computer-readable recording media are stored and implemented as a code that is readable in a distribution manner. Also, a font ROM data structure according to the present invention may be implemented using a computer-readable code in recording media such as ROM, RAM, CD-ROM, a magnetic tape, a hard disk, a floppy disk, a flash memory, an optical data storage device, all of which are computer-readable.

INDUSTRIAL APPLICABILITY

As described above, the movement detection method of a mobile node in a DSMIP6 environment according to an exemplary embodiment of the present invention can be useful to continuously perform operations as defined in a DSMIP6 specification to detect that the mobile node backing up the DSMIP6 confirms the NUD failure under an internet network environment in which IPv4 and IPv6 networks are used in a mixed state and moves to the IPv4 network through the response to the RS message, and to perform a binding update in time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A network movement detection method in a mobile node of a Dual Stack Mobile IPv6 (DSMIP6) environment, the method comprising:
    moving into new network;
    performing neighbor unreachability detection into the new network;
    confirming network movement detection and simultaneously performing an IPv4 address allocation when the neighbor unreachability detection fails;
    performing router discovery at the same time as the IPv4 address allocation;
    recognizing the movement detection into an IPv4 network when the IPv4 address allocation succeeds; and
    recognizing the movement detection into an IPv6 network when the router discovery and the IPv6 router discovery succeed.

2. The movement detection method of claim 1, further comprising recognizing movement detection into an IPv6 network of a dual stack network when the movement detection is confirmed to succeed in both of the IPv4 and IPv6 networks.

3. The movement detection method of claim 1, wherein the performing of router discovery at the same time as the IPv4 address allocation comprises:
   performing router discovery using a router solicitation message during a previously given period;
   processing router discovery failure when there is no response to the router solicitation message; and
   confirming whether the IPv4 address allocation succeeds during the previously given period.

4. The movement detection method of claim 3, further comprising:
   detecting movement to the IPv6 network when there is a response to the router solicitation message during the previously given period; and
   performing a binding update by acquiring an address for a router in the IPv6 network using information in the message on the basis of the response.

5. The movement detection method of claim 3, further comprising detecting movement to the IPv6 network when the mobile node receives a router advertisement message from the network to which the mobile node moves right after the mobile node is in contact with the network to which the mobile node moves without transmitting/receiving the correspondent node and the packet.

6. The movement detection method of claim 3, further comprising:
   receiving a router advertisement message from the moved network when the packet transmission/reception to/form the correspondent node is interrupted and the neighbor unreachability detection fails;
   detecting movement to the IPv6 network using information in the router advertisement message; and
   detecting movement to the IPv4 network when the reception of the router advertisement message is interrupted during the previously given period.

7. The movement detection method of claim 3, further comprising:
   detecting duplicate addresses by checking whether an address to be used is used in other nodes; and
   determining whether the correspondent node is present onto the link using a prefix.

8. The movement detection method of claim 1, wherein the IPv4 address allocation is performed by allocating an address through the internet addressing protocol (Dynamic Host Configuration Protocol; DHCP.

* * * * *